UNITED STATES PATENT OFFICE.

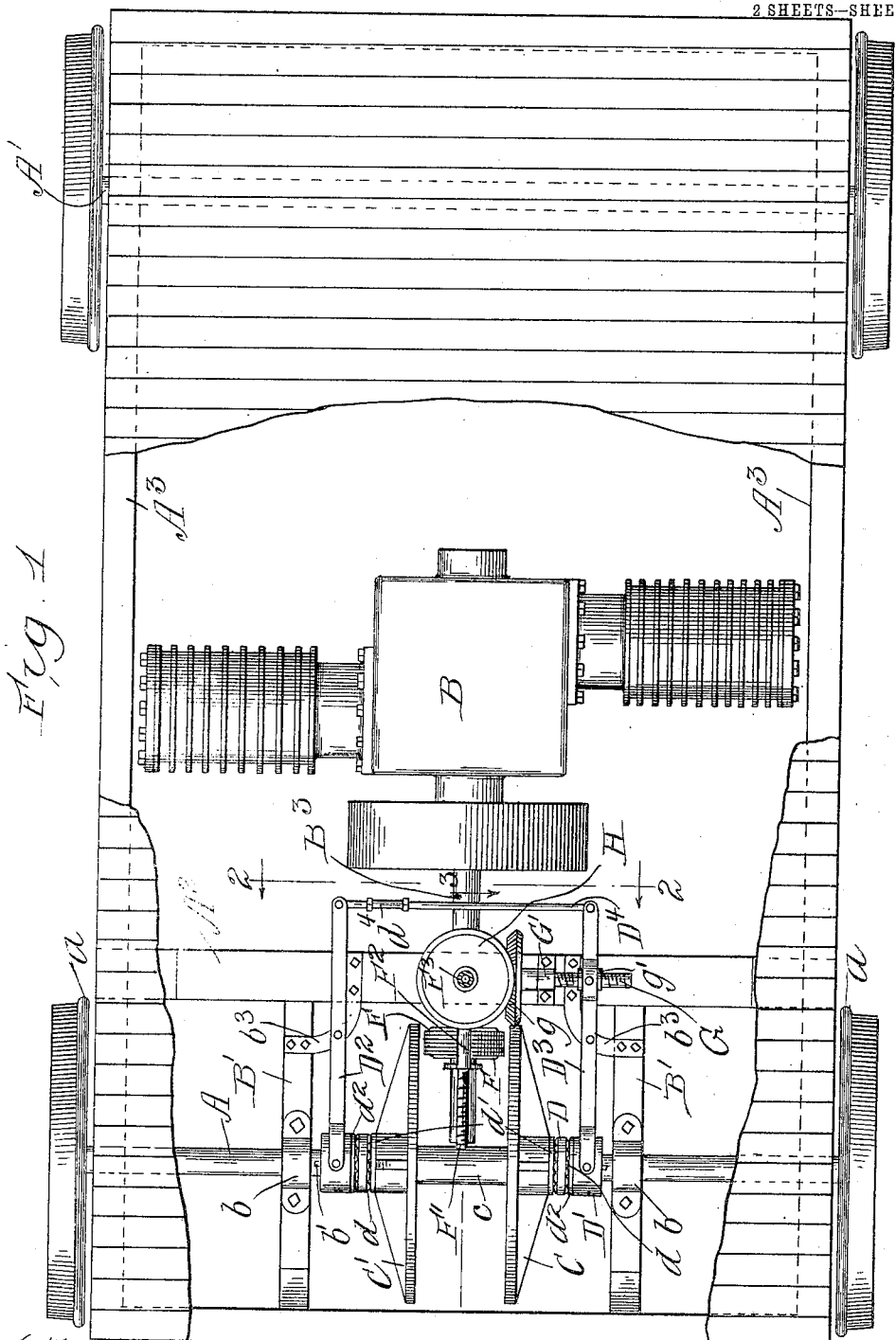

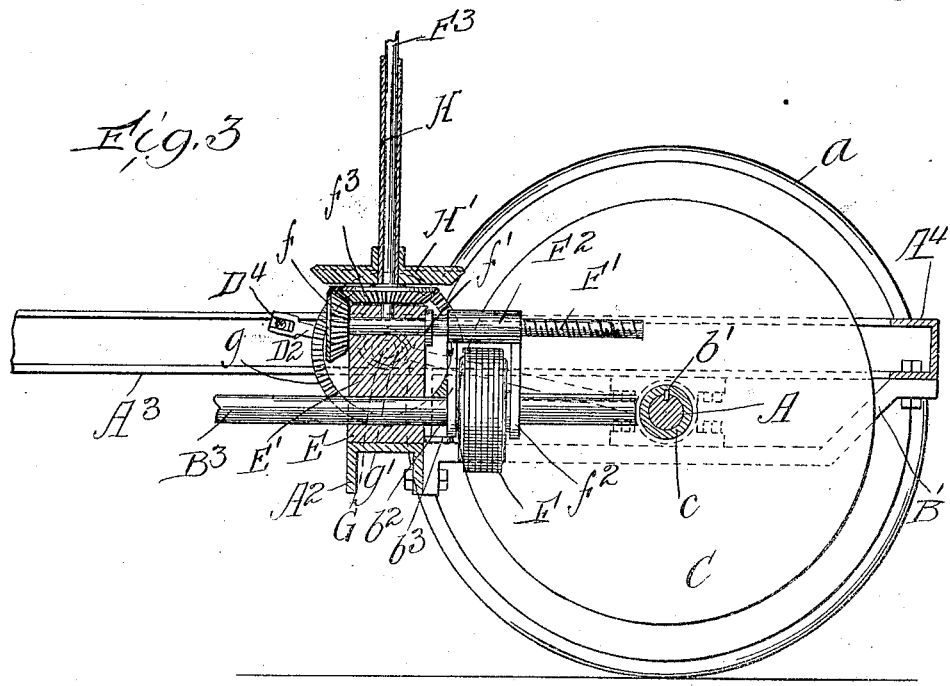
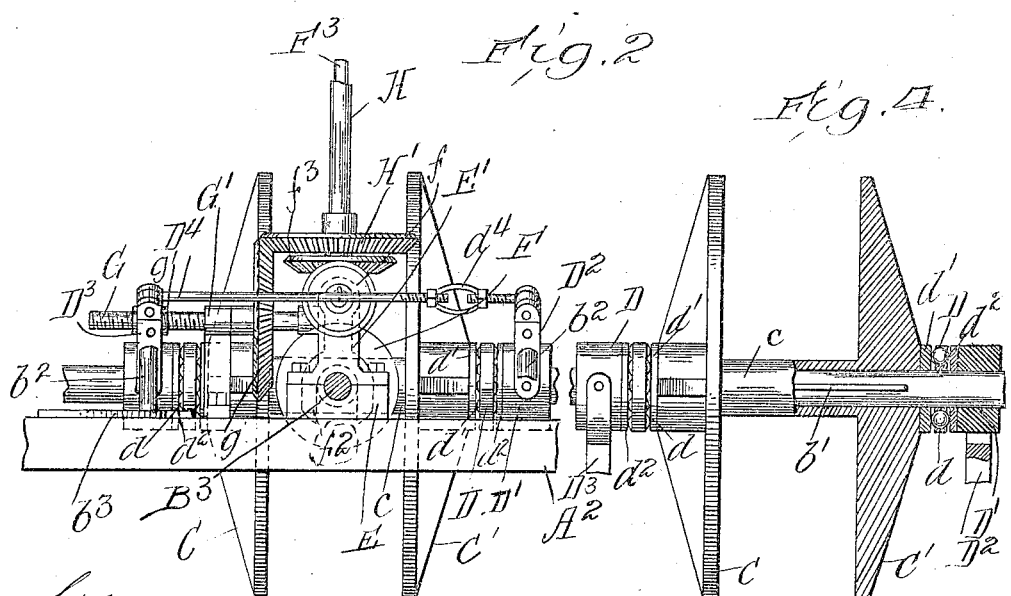

GEORGE W. MARBLE, OF CHICAGO, ILLINOIS.

POWER-TRANSMISSION DEVICE.

No. 807,627.　　　　　Specification of Letters Patent.　　　　Patented Dec. 19, 1905.

Application filed December 7, 1904. Serial No. 235,867.

*To all whom it may concern:*

Be it known that I, GEORGE W. MARBLE, a citizen of the United States, and a resident of the city of Chicago, in the county of Cook and State of Illinois, have invented certain new and useful Improvements in Power-Transmission Devices; and I do hereby declare that the following is a full, clear, and exact description of the same, reference being had to the accompanying drawings, and to the letters of reference marked thereon, which form a part of this specification.

This invention relates more particularly to a reversible and variable-speed power-transmission device for constant-speed motors, and for convenience of illustration is shown embodied in an inspection-car, though obviously it may be used to drive any other vehicle or for any other purpose for which it is adaptable.

Heretofore many different frictional transmission-gears have been devised more or less adaptable for use with constant-speed motors. Most of these, however, have been more or less objectionable, owing to the multiplicity of parts and also for the reason that if reversible at all the mechanism has been complicated and frequently incapable of adjustment to secure transmission without slippage, thereby not only occasioning a considerable lost motion and power in performing its work, but also requiring a great deal of care and skill to keep in repair. Furthermore, it has not heretofore been thought advantageous in such devices to carry the driving friction members directly upon the motor-shaft and to provide for the reversal of motion without reversing the motor.

It is a further object of this invention to provide means whereby the friction members may be quickly adjusted with respect to each other to give any desired degree of frictional engagement, to drive, operate as a brake, to reverse the drive, or vary the speed.

The invention consists in the matters hereinafter described, and more fully pointed out and defined in the appended claims.

In the drawings, Figure 1 is a top plan view, broken away, of an inspection-car and transmission embodying my invention. Fig. 2 is a fragmentary section taken on line 2 2 of Fig. 1. Fig. 3 is a section taken on line 3 3 of Fig. 1. Fig. 4 is a fragmentary section similar to Fig. 2, with parts removed, showing the manner of securing the driven friction members upon the shaft.

As shown in said drawings, the construction, as shown, is embodied as a part of the driving mechanism for an inspection-car, in which—

A and A' are the axles, of which A is driven by power transmitted from the motor B, which, though shown as an internal-combustion engine, may be any motor and may operate continuously independent of the movements and stops of the car. The motor may be supported and secured in any preferred manner to the car-frame. As shown, said car-frame is provided with a transverse beam or sill $A^2$, rigidly engaged to and beneath the side sills $A^3$ $A^3$ and secured thereon, and on the adjacent end sill $A^4$, on each side the longitudinal center, are longitudinal beams B' B', which in the particular frame shown more clearly in Figs. 1 and 3 are offset downwardly at their ends to pass below the axle A and are provided with bearings $b$ of any desired kind, in which said axle is journaled.

Slidably but non-rotatively engaged upon the axle A by means, as shown, of a spline $b'$ are friction-disks C and C', which are integrally connected by means of the sleeve $c$ and the inner faces of which are in parallel planes. At the outer side of each friction-disk and adapted to bear against the hub of the same is a ball or other antifriction bearing of any preferred type, but, as shown, each comprising an annular ball-retainer D, carrying a plurality of balls $d$, which engage on the side adjacent the friction-disk on a bearing-plate $d'$, which is rotative with the disks, and on the opposite side said balls engage a bearing-plate $d^2$, rigidly engaged upon a non-rotative collar D'. Said collars D' are slidably engaged upon the axle A, and pivotally engaged thereon are the forked levers $D^2$ $D^3$, which extend rearwardly and are pivoted centrally upon the upwardly-directed studs $b^2$ $b^2$, carried on the braces $b^3$ $b^3$, which are rigidly engaged at one end upon the longitudinal sills or beams B' B' and are curved laterally and rigidly engaged at the opposite ends upon transverse beam or sill $A^2$. The rear ends of said levers $D^2$ and $D^3$ are rigidly connected by means of the adjusting-rod $D^4$, which, as shown, is provided with a turnbuckle $d^4$, adapted to vary the distance between said lever ends, thereby varying the frictional engagement of the collars D' upon the respective ball-bearings and necessitating simultaneous movement of both levers.

Rigidly supported on the cross-sill $A^2$ is a central bearing-box E, in which is journaled the motor-shaft $B^3$, approximately at a level with the axle A. Splined on said shaft between said box and the axle A is the driving friction-wheel F, of paper of any desired material or construction. Means are provided for shifting said driving friction-wheel longitudinally of the shaft $B^3$ to vary speed, comprising, as shown, the standard $E'$, integral with the cap of the box E and in which is journaled a forwardly-directed screw-shaft $F'$, parallel with the shaft $B^3$ and which is held from longitudinal movement therein by means of the beveled pinion $f$ and by a collar $f'$, rigidly engaged on said shaft on opposite sides the standard. An internally-threaded sleeve $F^2$ is carried on said shaft, on each end of which is a downwardly-extending arm forming a yoke $f^2$, engaging said driving friction-wheel F at each end, so that when said shaft $F'$ is rotated said friction-wheel is moved radially of the friction-disks, the direction depending on the direction of rotation of the shaft $F'$. As shown, an upwardly-extending shaft $F^3$ is journaled at its lower end in said standard $E'$ and is provided with a beveled gear $f^3$, adapted to mesh with said beveled pinion $f$ to drive the shaft $F'$. For the purpose of moving the friction-disks C and $C'$ into or out of engagement with the friction-wheel F a screw-shaft G is journaled at its inner end in a suitable bearing in said standard $E'$ and centrally thereof in a standard $G'$, rigidly secured upon the cross-sill $A^2$. Said shaft G, as shown, is provided with a beveled gear $g$, the hub of which engages against the standard $G'$ and prevents longitudinal movement of the shaft. An internally-threaded nut $g'$, complemental with said screw-shaft G, is pivoted in the lever $D^3$, as shown in Fig. 1 and in dotted lines in Fig. 3. Rotation of said shaft thus moves said lever laterally, carrying with it the lever $D^2$ and causing corresponding movement of the collars $D'$ and shifting the disks C and $C'$ longitudinally of the shaft A. Meshing with the gear $g$ is a beveled gear $H'$, which, as shown, is positioned above and concentric with the gear $f^3$ and is provided with a tubular shaft inclosing the shaft $F^3$ for the speed-shaft and which, as well as said shaft $F^3$, may be provided with a hand-wheel or any preferred means for rotating the one independently of the other.

The operation is as follows: The driving friction-wheel F being engaged upon the motor-shaft $B^3$ is always driven in the same direction and at the motor speed. By means of the friction-disks C and $C'$, carried upon the axle A, the axle or shaft A can be driven in either direction, dependent upon which disk is in engagement with the driving friction-wheel. By means of the shaft H, which actuates the screw-shaft G, the pivoted levers $D^2$ and $D^3$ are simultaneously shifted in either direction, thereby carrying either of said friction-disks into or out of driving contact with the driving friction-wheel F. The antifriction-bearings at the hubs of said disks enable a firm gripping engagement to be had at all times with said disks, the degree of which may be varied by means of the connecting-rod $D^4$. When it is desired to vary the speed, the screw-shaft $F'$ is operated by the shaft $F^3$ shifting the driving friction-wheel radially of the disks.

While I have shown my device as embodied in an inspection-car, I do not purpose limiting this application otherwise than necessitated by the prior art, as obviously the invention may be used with vehicles of many kinds and for many other purposes and many details of construction may be varied without departing from the principles of my invention.

I claim as my invention—

1. The combination with a friction-wheel of a friction-disk on each side thereof, means for adjusting said friction-wheel radially of said disks, adjustably-connected levers engaging the outer sides of said disks and means engaging the same acting to move said disks simultaneously one into and the other out of engagement with said friction-wheel.

2. In a device of the class described the combination with a shaft or axle of a pair of friction-disks slidably engaged thereon, a rotative shaft intermediate said disks, a driving friction-wheel slidably engaged thereon, means adapted to adjust said driving friction-wheel longitudinally of its shaft, means holding said disks in unvarying relation and a pair of adjustably-connected levers acting to shift said disks simultaneously, the one into and the other out of engagement with the driving friction-wheel.

3. In a vehicle the combination with an axle, a motor-shaft, a friction-wheel actuated thereby, a pair of inwardly-facing friction-disks slidably engaged on the axle either adapted to engage said driving friction-wheel, adjustably-connected levers adapted to shift said disks simultaneously and rotative means acting to adjust said driving friction-wheel radially of the disks.

4. The combination with a vehicle-frame and one of its axles, of a pair of unvaryingly-distanced friction-disks slidably engaged thereon and rotative therewith, a pair of adjustably-connected levers for simultaneously shifting said disks longitudinally of the axle, a driving-shaft carried on said frame and extending between said disks, a friction-wheel slidable thereon adapted to be engaged by either disk and a screw-shaft engaging one of said levers for adjusting either of said disks into engagement with said friction-wheel.

5. The combination with a shaft or axle, of a pair of permanently-spaced friction-disks slidably engaged thereon, a driving-shaft extending between the same, a friction-wheel slidable thereon, a yoke adapted to travel longitudinally of the driving-shaft and shift the friction-wheel radially of the disks and adjustably-connected levers acting to shift the disks relatively to the driving friction-wheel.

6. In a device of the class described the combination with a vehicle-frame, of a motor-shaft thereon, a longitudinally-movable driving friction-wheel on said shaft, an axle journaled in said frame, a friction-disk on said axle at each side the driving friction-wheel, a lever pivoted at the outer side of each disk, antifriction-bearings connected therewith adapted to engage said disks, means for varying the contact of said bearings and means acting to shift said disks relatively the driving friction-wheel.

7. In a device of the class described the combination with an axle of a pair of inwardly-facing friction-disks slidably engaged thereon, antifriction-bearings at the outer sides of said disks, adjustable means adapted to grip said bearings and disks between the same and to move said disks longitudinally of the axle, a positively-driven friction-wheel intermediate said disks adapted to be engaged by either to rotate said axle and rotative means for shifting said disks.

8. In a device of the class described the combination with a vehicle-frame of an axle journaled therein, a pair of rigidly-connected friction-disks slidably engaged thereon and antifriction-bearings at the outer sides of said disks, adjustable means adapted to hold said bearings into positive engagement with said disks, a screw-shaft engaged therewith adapted to shift the disks longitudinally of the axle, a motor-shaft, a driving friction-roller driven thereby and radially adjustable between the disks and adapted to drive either.

9. In a device of the class described the combination with a vehicle-frame, and one of its axles of longitudinally-movable connected friction-disks on said axle, a driving-shaft extending between said disks, a driving friction-wheel slidable on said shaft, a yoke adapted to move said friction-wheel longitudinally of the shaft, a screw-shaft engaged in said yoke, means for rotating the same and adjustable means adapted to move either of said disks into or out of contact with said driving friction-wheel.

10. In a device of the class described the combination with a vehicle-axle, of a pair of connected friction-disks slidably engaged on said axle and rotative therewith, a motor-shaft carried on said vehicle, and extending between said disks, a driving friction-wheel slidably engaged on said shaft, adjustably-connected, pivotally-supported levers engaging said disks, a screw-shaft operatively engaged with one of said levers and held from longitudinal movement, means for operating said screw-shaft, a yoke engaging said driving friction-wheel and means adapted to operate said yoke and adjust said friction-wheel radially of the disks.

11. In a device of the class described the combination with a vehicle-axle, of a pair of inwardly-facing, integrally-connected disks slidably engaged thereon, an antifriction-bearing at the outer sides of said disks, a lever pivotally engaged on each bearing, means adjustably connecting said levers, a drive-shaft projecting between said disks, a friction-wheel slidably engaged on said shaft between the disks, a screw-shaft journaled above the drive-shaft, a yoke movable longitudinally thereof and adapted to adjust the friction-wheel radially of the disks, means for operating said screw-shaft and means for operating said levers and adjusting the disks relative to said friction-wheel.

In testimony whereof I have hereunto subscribed my name in the presence of two subscribing witnesses.

GEORGE W. MARBLE.

Witnesses:
W. W. WITHENBURY,
H. S. RUDD.